H. D. ROBINSON.
PIPE COUPLING.
APPLICATION FILED JULY 1, 1908.

930,692.

Patented Aug. 10, 1909.

Witnesses
M. C. Lyddane
J. A. L. Mulhall

Inventor
Henry D. Robinson
By Joshua R. H. Potts
Attorney

UNITED STATES PATENT OFFICE.

HENRY D. ROBINSON, OF PHILADELPHIA, PENNSYLVANIA.

PIPE-COUPLING.

No. 930,692.   Specification of Letters Patent.   Patented Aug. 10, 1909.

Application filed July 1, 1908. Serial No. 441,283.

*To all whom it may concern:*

Be it known that I, HENRY D. ROBINSON, a subject of the King of England, residing at Philadelphia, in the county of Philadelphia and State of Pennsylvania, have invented certain new and useful Improvements in Pipe-Couplings, of which the following is a specification.

My invention relates to pipe couplings and particularly to that character of coupling having two contact disk-like plates provided with concentric inter-engaging ribs and grooves, the object of my invention being to provide a coupling which will allow of a much tighter packing than couplings of the same character but of different construction, and wherein it will be impossible for the fluid within the pipe to escape past the contacting packed faces of the coupling.

My invention consists in the arrangement of parts and details of construction set forth in the accompanying specification and particularly stated in the claim.

Figure 1:
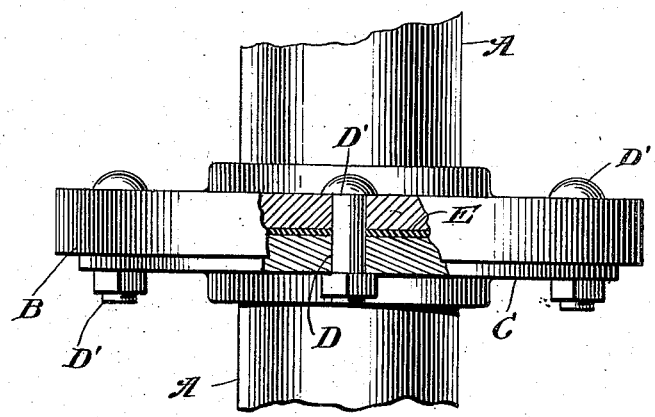
Figure 2:
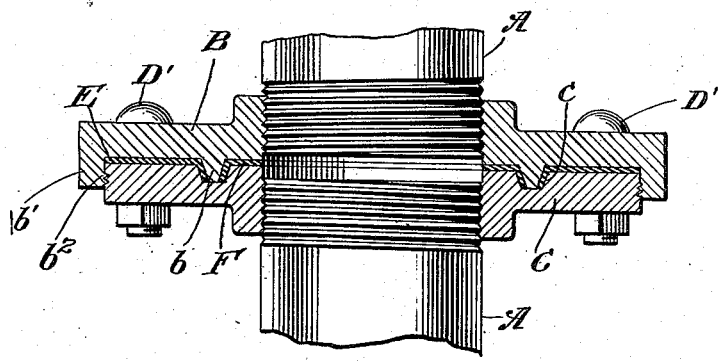
Figure 3:
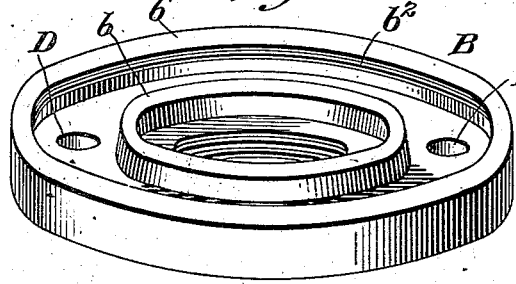
Figure 4:
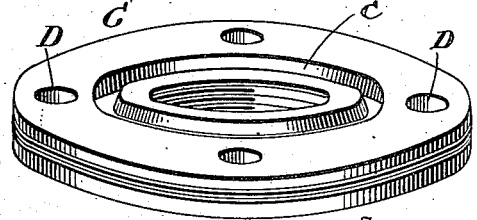

In the drawings, Figure 1, is a side elevation of a coupling made in accordance with my invention, one portion thereof being partly broken away. Fig. 2, is a diametrical section of the coupling shown in Fig. 1. Fig. 3, is a perspective view of one member of the coupling, and Fig. 4, is a perspective view of the other.

In the drawings A designates pipe sections screw threaded at their ends and each carrying one member of my coupling. Each member consists of a flattened annular disk screw-threaded on its interior for engagement with the pipe end A. One of said disks being provided on its inner face with a rib which is adapted to project into an annular groove formed in the inner face of the opposed member.

In detail the member B has on its inner face the projecting annular rib $b$ located between the central opening of the coupling and the circumference thereof. On its circumference the member B is provided with a flange $b'$ which is adapted to surround and project over the periphery of the member C. The interior edge of the downwardly projecting flange $b'$ is screw threaded as at $b^2$. The member C is sufficiently smaller than the member B so as to fit the inside of the downwardly projecting flange $b'$ and is provided on its periphery with screw threads adapted to engage with the screw threads $b^2$. It is to be noted that the screw threads on the exterior circumference of the member C are so located that a plain surface is left over the forward portion of the periphery, thus allowing the member C to be inserted some distance within the member B before it has to be turned into engagement therewith. This permits easy attachment and detachment. The member C is also provided with an annular groove $c$ into which the annular rib $b$ projects. Both the rib and groove have inclined or beveled sides for the purpose of jamming the packing rings into said groove as shown in Fig. 2. Flat annular faces are left between the central opening of the plates and the rib or groove, or between the rib or groove and the periphery of the disks. Bolt holes D are provided in both members through which bolts D' pass.

Interposed between the two members B and C are packing rings E, F, of any suitable description. The packing rings are slightly wider than the space between the groove $c$ and the central opening and the groove and the circumference of the member C. The rings, E, F thus project over said groove and are adapted to be forced down into the groove by the beveled rib $b$ when the two members are engaged with each other. The packing ring has an opening in it through which the bolts D' pass, these openings fitting the bolts snugly as shown in Fig. 1.

My construction provides an outer protective flange which prevents leakage at the periphery of the disks, and protects the packing from the deterioration to which it is liable. The packing is entirely sealed within the joint by the screw-threads (which may be filled with red lead as is usual in pipe couplings) and entirely protected from the entrance of water or the action of gases. The wedge-like shape of the rib $b$ acts to compress the inner and outer edges of the adjacent packing rings. Thus the packing of the joint does not entirely depend on the tightening of bolts D' for its effectiveness.

Having thus described my invention what I claim as new and desire to secure by Letters Patent is:

A pipe coupling, comprising two circular disks, one disk having a central pipe receiving screw threaded opening, and having screw threads on its periphery, the other disk having a central screw threaded pipe receiving opening, and an annular internally screw threaded flange at its outer edge, the threads of said flange meshing with the threads on said first mentioned disk, a circular rib on one of said disks concentric with the central opening therein, the other disk having a circular groove into which the rib projects, openings in said disks, clamping bolts in said openings, and packing rings between said disks, said packing rings of a combined width greater than the width of the smaller disk, and both of said disks forced into said groove by the said rib.

In testimony whereof I have signed my name to this specification in the presence of two subscribing witnesses.

HENRY D. ROBINSON.

Witnesses:
J. A. L. MULHALL,
C. E. POTTS.